(12) United States Patent
Narayan

(10) Patent No.: US 11,724,288 B2
(45) Date of Patent: **\*Aug. 15, 2023**

(54) SYSTEMS, METHODS, AND DEVICES FOR CLASSIFYING AND IDENTIFYING WASTE IN REAL-TIME

(71) Applicant: Yash Narayan, San Carlos, CA (US)

(72) Inventor: Yash Narayan, San Carlos, CA (US)

( \* ) Notice: Subject to any disclaimer, the term of this patent is extended or adjusted under 35 U.S.C. 154(b) by 80 days.

This patent is subject to a terminal disclaimer.

(21) Appl. No.: 17/517,480

(22) Filed: Nov. 2, 2021

(65) Prior Publication Data

US 2022/0219206 A1 Jul. 14, 2022

Related U.S. Application Data

(63) Continuation of application No. 17/146,041, filed on Jan. 11, 2021, now Pat. No. 11,161,153.

(51) Int. Cl.
| | |
|---|---|
| *B07C 5/342* | (2006.01) |
| *G06K 9/62* | (2022.01) |
| *B09B 3/00* | (2022.01) |
| *G06K 9/00* | (2022.01) |
| *B07C 7/00* | (2006.01) |
| *G06F 3/16* | (2006.01) |
| *G06F 18/214* | (2023.01) |
| *G06F 18/243* | (2023.01) |
| *G06V 20/20* | (2022.01) |

(52) U.S. Cl.
CPC ............ *B07C 7/005* (2013.01); *B07C 5/3422* (2013.01); *B09B 3/00* (2013.01); *G06F 3/16* (2013.01); *G06F 18/214* (2023.01); *G06F 18/243* (2023.01); *G06V 20/20* (2022.01)

(58) Field of Classification Search
CPC ........... B07C 5/3422; B07C 7/05; B09B 3/00; G06F 3/16; G06K 9/671; G06K 9/6256; G06K 9/6279
USPC ....................................................... 209/549
See application file for complete search history.

(56) References Cited

U.S. PATENT DOCUMENTS

| | | | |
|---|---|---|---|
| 2004/0194273 A1* | 10/2004 | Yamakado | ................ B09B 5/00 |
| | | | 29/403.3 |
| 2019/0011910 A1* | 1/2019 | Lockwood | ............. G08G 1/165 |
| 2020/0122321 A1 | 4/2020 | Khansari Zadeh | |
| 2020/0143336 A1* | 5/2020 | Klinkhamer | .......... H04L 9/0643 |
| 2020/0222949 A1 | 7/2020 | Murad | |
| 2021/0027485 A1 | 1/2021 | Zhang | |
| 2021/0035146 A1* | 2/2021 | Odom | .................... G06Q 10/30 |

FOREIGN PATENT DOCUMENTS

CN 201910729376.9 A 12/2019

OTHER PUBLICATIONS

Banta; Travis (Applicant's Representative), Interview Request Form, dated Jun. 3, 2021; 2 Pages.

\* cited by examiner

*Primary Examiner* — Dakshesh D Parikh
(74) *Attorney, Agent, or Firm* — Travis Banta; Loyal IP Law, PLLC

(57) ABSTRACT

A device is disclosed which includes a processor, a screen, and either or both of a camera and a microphone. The device may receive input related to a waste item, identify the waste item, classify a disposal type for the waste item, and provide a suggestion for disposing of the waste item.

11 Claims, 7 Drawing Sheets

SYSTEMS, METHODS, AND DEVICES FOR CLASSIFYING AND IDENTIFYING WASTE IN REAL-TIME

BACKGROUND

1. Technical Field

This disclosure relates generally to methods, systems, and devices for intelligent garbage management. More specifically, the methods, systems, and devices disclosed herein relate to a mobile computing system which performs real-time image classification of waste. In some embodiments, waste classification may be based on machine learning.

2. Description of the Related Art

Every year, the world generates over 2 billion tons of solid waste. Even though much of this waste is recyclable, more than 75% of it ends up in our landfills. Further, more than 90% of plastic isn't recycled and only about 5% of food and other organic waste is composted. This waste generates over a billion metric tons of $CO_2$ equivalent greenhouse gases, contributing nearly as much to global warming as all the cars on American roads. These catastrophic outcomes largely stem from human confusion in the identification and correct disposal of waste into waste bins. In fact, many people would recycle and compost more if it was easier. Reducing erroneous waste disposal by even 1%, would be equivalent to removing over 6.5 million gasoline-burning passenger vehicles from the road.

Most previous attempts to classify waste use expensive hardware solutions that are deployed at a recycling center. The high cost of these solutions have so far been a deterrent to adoption of these solutions. For example, one apparatus used to automatically detect whether an item is recyclable or not is based on a light-weight neural network. Another solution utilizes the sound generated when a waste item is put inside a trash bin to classify whether or not it is indeed trash. However, the high cost of these "smart bins" make it virtually impossible to reach ubiquitous market adoption. Also, the smart bin approach, or waste classification at the recycling center is often too late, happening after the waste has already been incorrectly disposed and has contaminated other waste, and therefore, doesn't prevent waste contamination from happening in the first place. Because of this, there is an urgent need for a quick, accurate, and low-cost method that is available for everyone even before or at the time of disposal to know exactly where to dispose of their waste.

Thus far, solutions for accurately identifying and classifying waste have been largely impractical because a significant amount of recyclable waste frequently accompanies waste that could be composted. Recycling centers, for example, have not utilized compost as an option for classifying waste. This is a significant problem because when compostable material such as food scraps and green waste gets into a landfill, it is generally compacted and covered. This removes the oxygen and causes the material to break down in an anaerobic process. Eventually, anerobic breakdown of compostable material releases methane, a greenhouse gas that is 25 times more potent than carbon dioxide in warming the earth over a 100-year timescale (and more than 80 times on a 20-year timescale).

Accordingly, it is one object of this disclosure to provide methods, systems, and devices, which identify waste and classify the waste for disposal. It is another object of this disclosure to provide a user with a visual representation of suggested recycling options for disposing of different waste. It is another object of this disclosure to provide a method for accurately identifying the waste based on machine learning, and providing the user with suggested recycling options.

SUMMARY

In one embodiment, a device is disclosed which includes a processor, a screen, and either or both of a camera and a microphone. The device may receive input related to a waste item, identify the waste item, classify a disposal type for the waste item, and provide a suggestion for disposing of the waste item.

In another embodiment, a method is disclosed. The method may include receiving input to a waste item by a processor. The method may further include identifying, by the processor, the waste item and classifying by the processor a disposal type for the waste item. In response, the method may display on a screen associated with the processor, for example, a suggestion for disposing of the waste item.

BRIEF DESCRIPTION OF THE DRAWINGS

The accompanying drawings illustrate various embodiments of the device, system, and method for identifying, classifying, and suggesting a disposal type for waste items.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or figure, may be alternatively included in another embodiment or figure regardless of whether or not those elements are shown or described in another embodiment or figure. In other words, elements in the figures may be interchangeable between various embodiments disclosed herein, whether shown or not.

Figure 1:
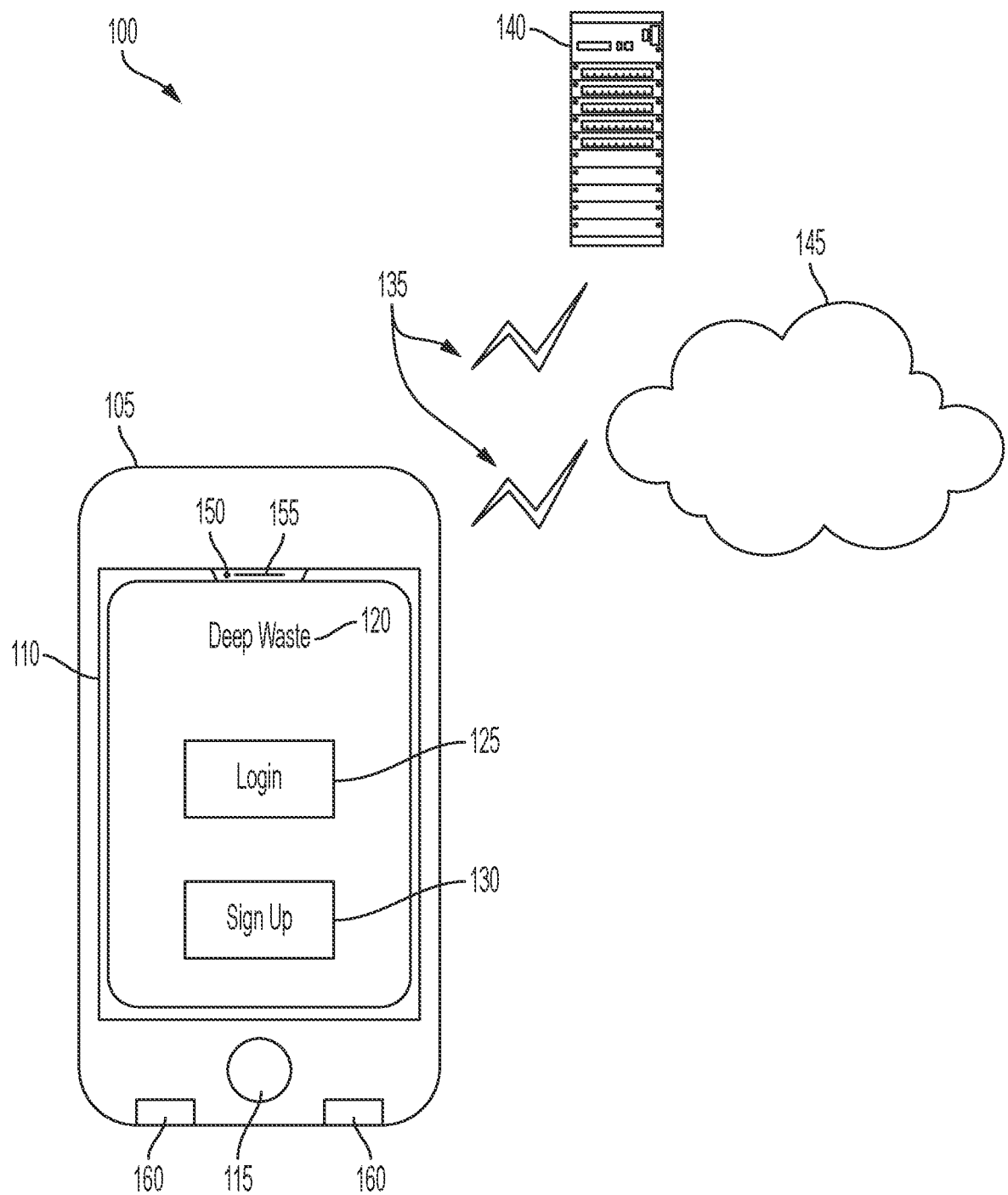
FIG. 1 illustrates a device in a system for identifying and classifying waste items.

FIG. 1 illustrates a device 105 in a system 100 for identifying and classifying waste items. Device 105 may be a computing device 105. Examples of computing devices include desktop computers, laptop computers, tablets, game consoles, personal computers, notebook computers, smartphones, wearable devices, and any other electrical computing device with access to processing power sufficient to interact in a timely manner with a server computer 140 or cloud server 145 via a wired or wireless connection 135. Device 105, server computer 140, and cloud server 145 may each include software and hardware modules, sequences of instructions, routines, data structures, display interfaces, and other types of structures that execute computer operations. Further, hardware components may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein.

Wired or wireless connection 135 may allow device 105 to access or transmit information from/to server computer 140 and cloud server 145 via an internet connection to server computer 140 or cloud server 145. Any suitable internet connection may be implemented including any wired, wireless, or cellular based connections. Examples of these various internet connections include implemented using Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a 5G network, a 6G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between device 105 and server computer 140 and cloud server 145.

Device 105 may include a screen 110 which may include a user interface element 115 (illustrated as a button but which may also include touch screen technology which allows a user to interact with device 105 by means of an input device such as a keyboard, a mouse, a stylus, or even a user's finger). Screen 110 may include one or more user interface elements, such as an informational element 120, and user interactive elements 125 and 130. User interface elements, such as informational element 120 may provide a user with a display of information concerning interacting with device 110. User interactive elements 125 and 130 may provide a user with options, which are selectable by interfacing with one of user interactive elements 125 and 130, which allow a user to navigate and use device 105 to identify and classify a waste object. Device 105 may further include a camera 150, a speaker 155, and one or more microphones 160 which allow a user to take pictures, interact with audible interface options, and audibly respond to audible interface options provided via device 105. As shown in FIG. 1, informational element 120 provides information to the user, such as a name of the functionality provided by device 105. User interactive elements 125 and 130 allow the user to login to an account associated with the functionality or sign up to use the functionality provided via device 105, server computer 140 and cloud server 145.

Figure 2:
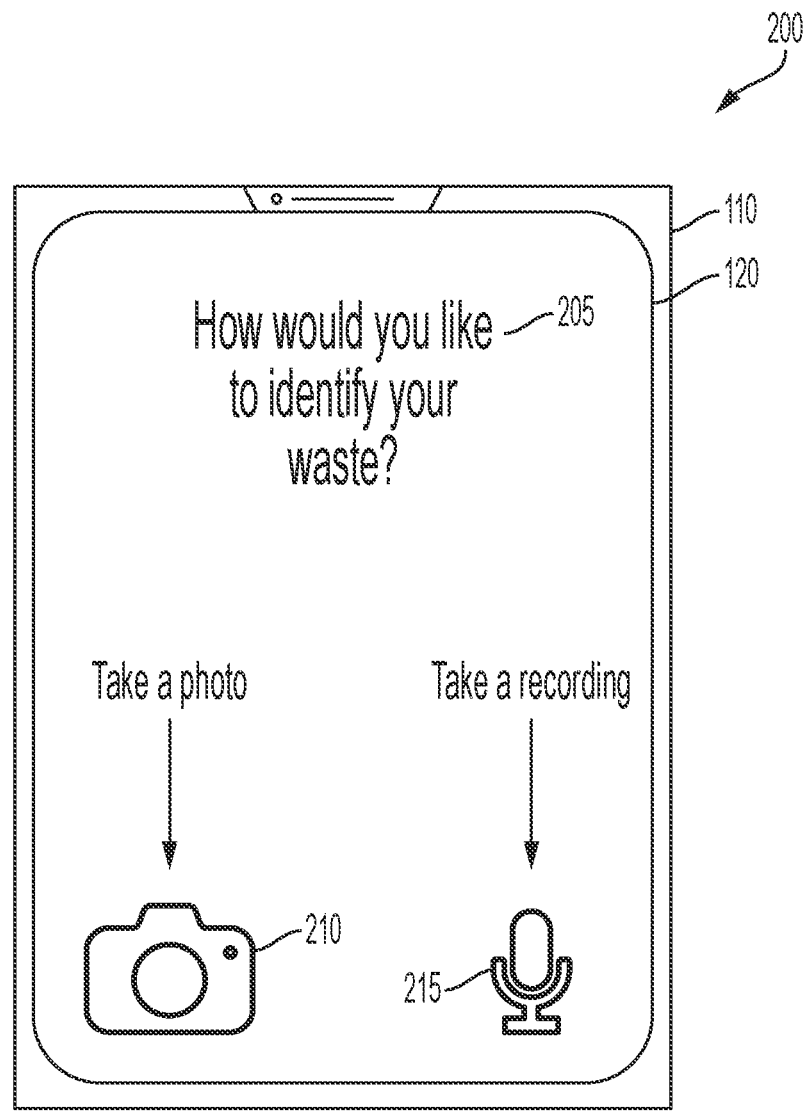
FIG. 2 illustrates a graphical user interface in the device shown in FIG. 1 for identifying and classifying waste items.

FIG. 2 illustrates a graphical user interface 200 on screen 110 of the device 105 shown in FIG. 1 for identifying and classifying waste items. Screen 110 may include a user interface 120, which includes an information display element 205, a camera icon element 210, and a recording icon element 215. Graphical user interface 200 may allow a user to select either the camera icon element 210, using for example, a touch screen smart phone, to take a picture of waste or recording icon element 215, using one or more microphones 160 included in device 105, shown in FIG. 1. Either a picture or a verbal description of the waste may be used by system 100, shown in FIG. 1 to appropriately identify and classify waste, as will be discussed below.

Figure 3:
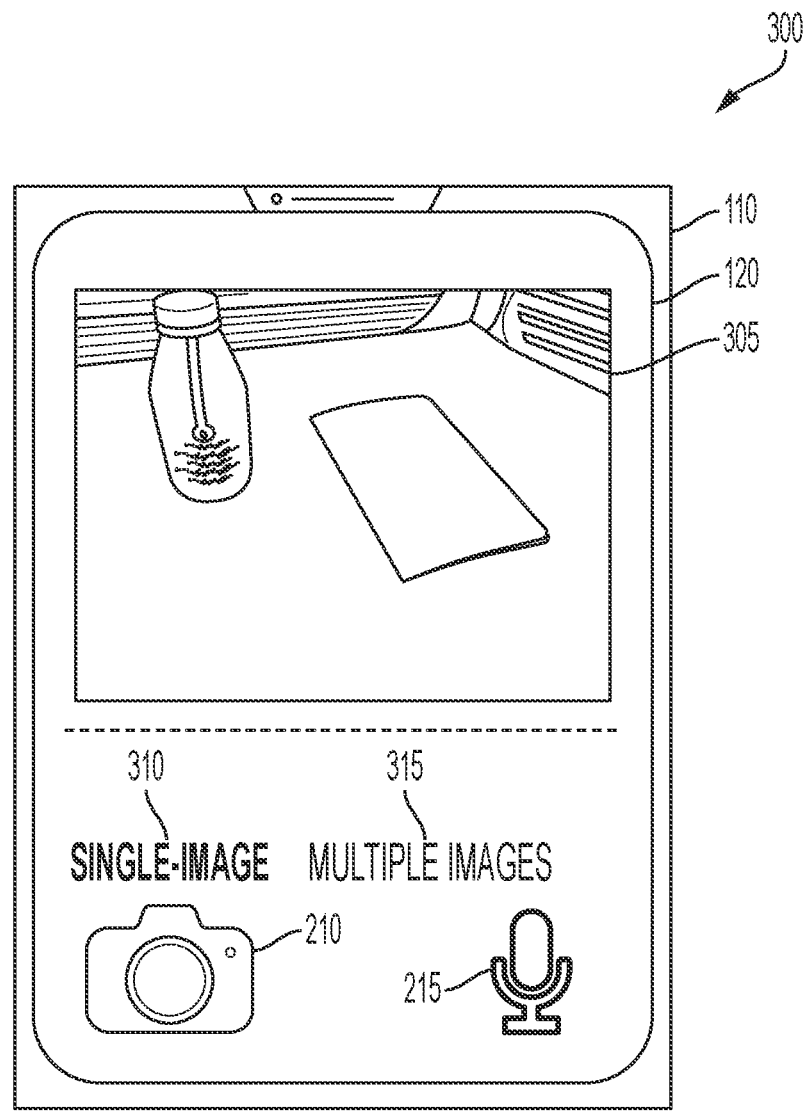
FIG. 3 illustrates a graphical user interface in the device shown in FIG. 1 for identifying and classifying waste items based on a picture of the waste items.

FIG. 3 illustrates a graphical user interface 300 in device 105 shown in FIG. 1 for identifying and classifying waste items based on a picture of the waste items. In response to selecting, for example, camera icon element 210, screen 110 may display a live camera view 305 in user interface 120. Graphical user interface 300 may provide a single image icon 310 or a multiple images icon 315 which allow a user to take one picture of waste items or multiple pictures of multiple waste items using camera icon element 210, shown and described above with respect to FIG. 2. As shown, live camera view 305 is an example of a single image taken of two waste items which may be identified and classified by system 100. It is also noted that a recording icon element 215 may cause device 105, shown in FIG. 1 to switch into a recording functionality for identifying and classifying waste, as will be described below. In response to an image being taken through device 105 shown in FIG. 1, the image data representative of the picture may be transmitted to server computer 140 shown in FIG. 1 and/or cloud server 145 by connection 130 for identification and evaluation.

Figure 4:
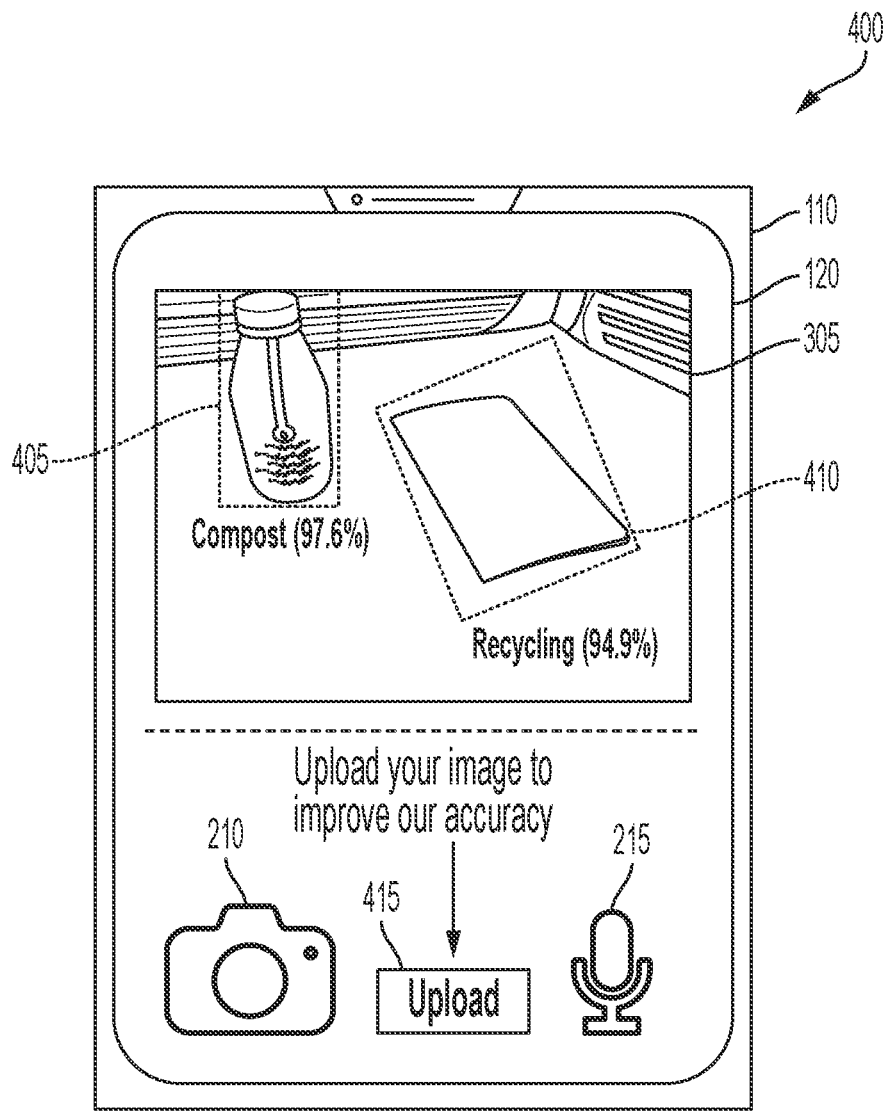
FIG. 4 illustrates a graphical user interface in the device shown in FIG. 1 illustrating the identification and classification of waste items shown in the picture illustrated in FIG. 3.

FIG. 4 illustrates a graphical user interface 400 in device 105 shown in FIG. 1 illustrating the identification and classification of waste items shown in the picture illustrated in FIG. 3. Screen 110 may include a user interface 120, which includes an information display element 205, a camera icon element 210, and a recording icon element 215. Live camera view 305 in user interface 120 may include a cardboard bottle and a paper binder with plastic covers. In response to evaluating the image data representative of the picture, system computer server 140 and/or cloud server 145 may provide an indication of a disposal solution to device 105 for display on screen 110 and live camera view 305. In other words, based on information provided from computer server 140 and/or cloud server 145, device 105 may provide indicators 405 and 410 which identify the waste item and provide a type and composition of the waste. For example, a cardboard bottle, similar to those used in coffee cups, for example, is evaluated and identified as a coffee cup, made of paper, which is then classified as being disposable through composting methods. Evaluation and identification of a particular waste item may be performed in a variety of ways, including image comparison of an object detected in live camera view 305 with an image of a known sample of a similar object, detection of recycling labels printed on the waste item itself, an evaluation of the materials that compose the waste item themselves, and any other technique known in the art. System 100, shown in FIG. 1 may further apply machine learning to recognize and improve recommendations via indicators 405 and 410 to improve evaluation and identification of the particular waste item.

Indicator 405 and 410 may be color coded to indicate that a particular waste item should be disposed of in a manner that corresponds to a color of indicators 405 and 410. For example, indicator 405 may be yellow which indicates that the waste item indicated should be composted while indicator 410 may be blue which indicates that the waste item indicated should be placed in a recycling bin for recycling. Other types of recycling, such as glass, aluminum, and other materials may be so color coded such that the coloring of the indicator provides an indication of the type of disposal (e.g., recycling) that is recommended for a particular waste item. Indicators 405 and 410 may but need not encircle the waste item as shown in FIG. 4, but may provide an indication to the user of a suggested disposal technique for the identified waste items, including an evaluation of the main constituent material of the waste item by percentage or by illustrating a percentage confidence in the suggested disposal technique, as shown in FIG. 4.

User interface 120 further provides an opportunity for a user to take additional photos via camera element icon 210 or select audible recording functionality via recording element icon 215. User interface 120 further provides an option to submit the image data representative of the picture to system 100, shown in FIG. 1 as a learning tool for the machine learning functionality of computer server 140 and/or cloud server 145.

Figure 5:
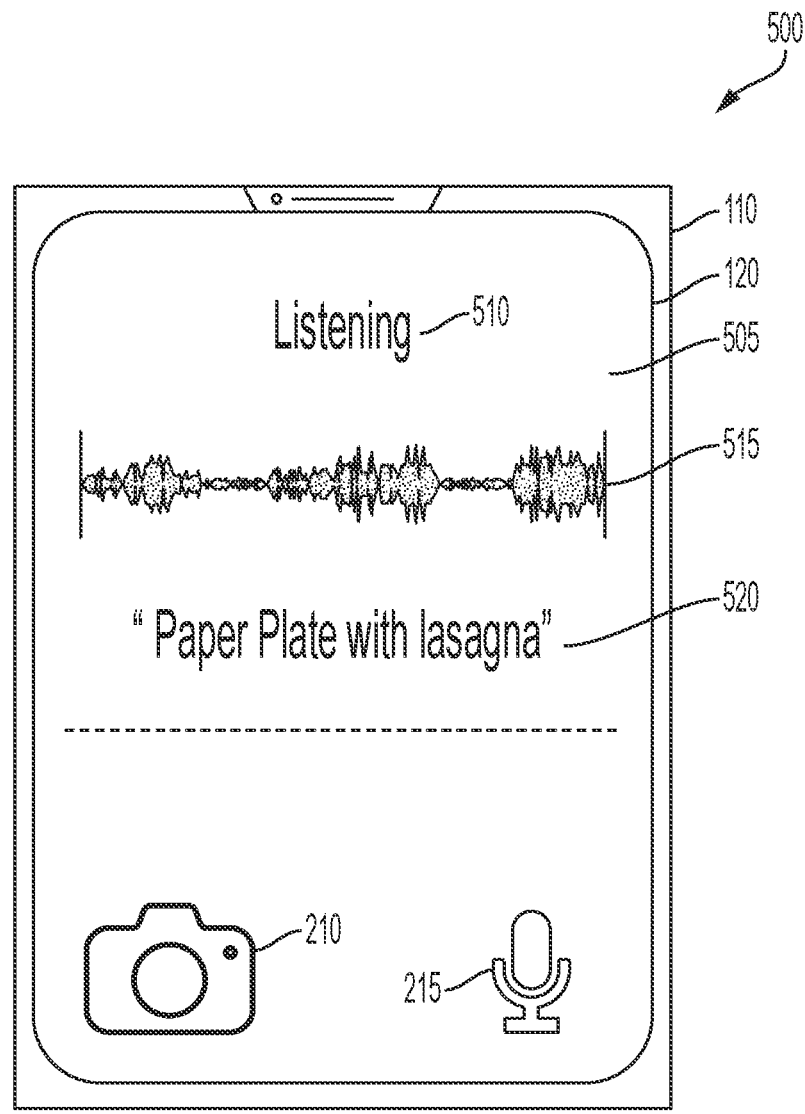
FIG. 5 illustrates a graphical user interface in the device shown in FIG. 1 for identifying and classifying waste items based on an audible description of the waste items.

FIG. 5 illustrates a graphical user interface 500 in device 105 shown in FIG. 1 for identifying and classifying waste items based on an audible description of the waste items. Screen 110 may include a user interface 120, which includes an information display element 505, a camera icon element 210, and a recording icon element 215. As previously discussed, recording icon element 215 may, based on interaction from a user with screen 110 or device 105, shown in FIG. 1, activate one or more microphones 160 shown in FIG. 1, to receive a verbal or audible explanation of a waste item. User interface element 120 may provide a status indicator 510 which indicates that device 105, shown in FIG. 1, is listening and is prepared to receive audible input. User interface 120 may further provide a receiving indicator 515 which may indicate to the user that audible input is being received. Receiving indicator 515, shown in FIG. 5 illustrates an exemplary waveform representative of the audible input received by device 105, shown in FIG. 1. User interface element 120 may further include a text indicator 520 representative of a speech to text output of the audible input. As shown in FIG. 5, a user has selected recording icon element 215 and is speaking the words "paper plate with lasagna" for identification and classification as a waste item. Status indicator 510 indicates, in response to the user interacting with recording icon element 215, that the device is ready to receive (e.g., listening) audio input. Receiving indicator 510 indicates that the device is actively receiving audio input while text indicator 520 provides a speech to text representation of the audible input.

Figure 6:
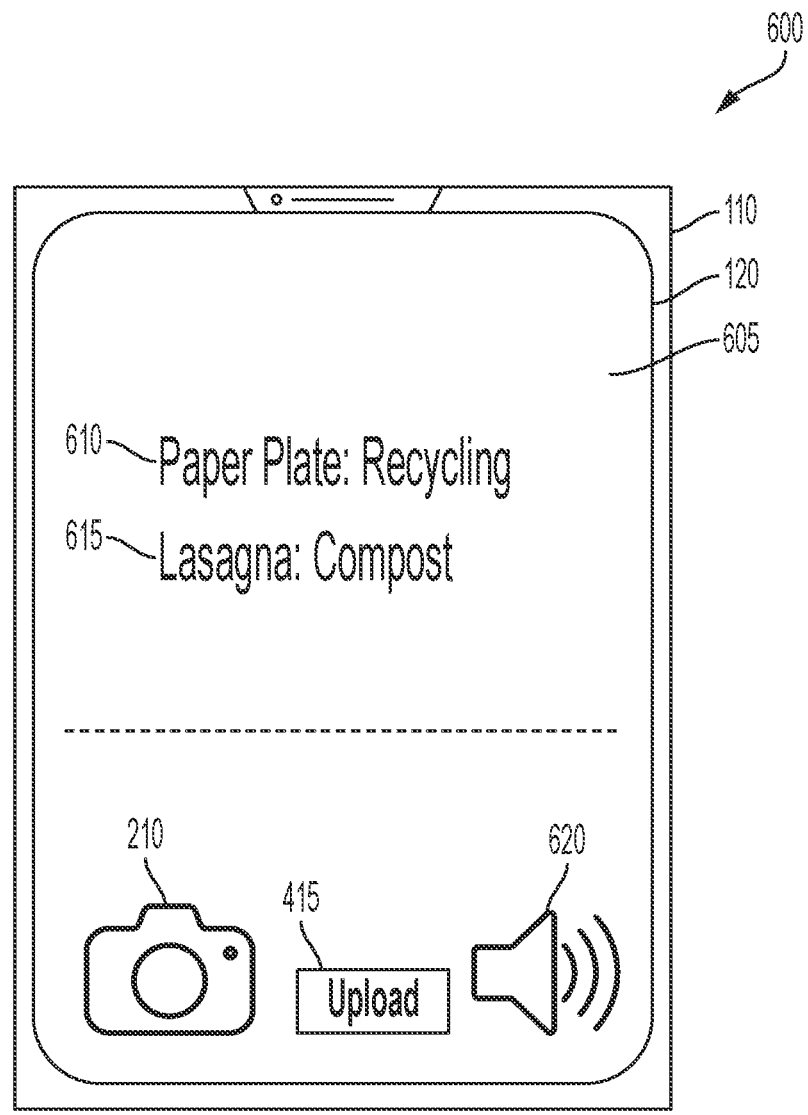
FIG. 6 illustrates a graphical user interface in the device shown in FIG. 1 illustrating the identification and classification of waste items described in the audible description of waste items shown in FIG. 5.

FIG. 6 illustrates a graphical user interface in device 105 shown in FIG. 1 illustrating the identification and classification of waste items described in the audible description of waste items shown in FIG. 5. Screen 110 may include a user interface 120, which includes an information display element 605, a camera icon element 210, and an audio identification icon element 620. Information display element may provide a waste identification and classification 610 and 615 for each waste item described in the audio input discussed above with respect to FIG. 5. In practice, device 105 may provide the audio input to computer server 140 and/or cloud server 145 by, for example, connection 130 for evaluation by computer server 140 and/or cloud server 145.

In response to evaluating the image data representative of the picture, computer server 140 and/or cloud server 145 may provide an indication of a waste identification and classification 610/615 to device 105 for display on screen 110 in information display element 605. In other words, based on information provided from computer server 140 and/or cloud server 145, device 105 may provide an indication of a waste identification and classification 610/615 which identify the waste item. In the embodiment of FIG. 6, computer server 140 and/or cloud server 145 may access a table in memory, or other techniques known in the art, to provide a classification of disposal for a waste item such as recycling or compost, in a manner similar to that discussed above with respect to FIG. 3.

As previously discussed, screen 110 may further include an audio identification icon element 620. Audio identification icon element 620 may receive interaction from a user and cause device 105 to emit an audible signal representative of the information contained in the indication of waste identification and classification 610/615 via speaker 155 shown in FIG. 1. In other words, audio identification icon element 620 may provide a user with the ability to hear the indication of waste identification and classification 610/615 without a visual indicator. In this manner device 105 may provide either or both of a visual indicator using the techniques described above and an audible indicator.

Figure 7:
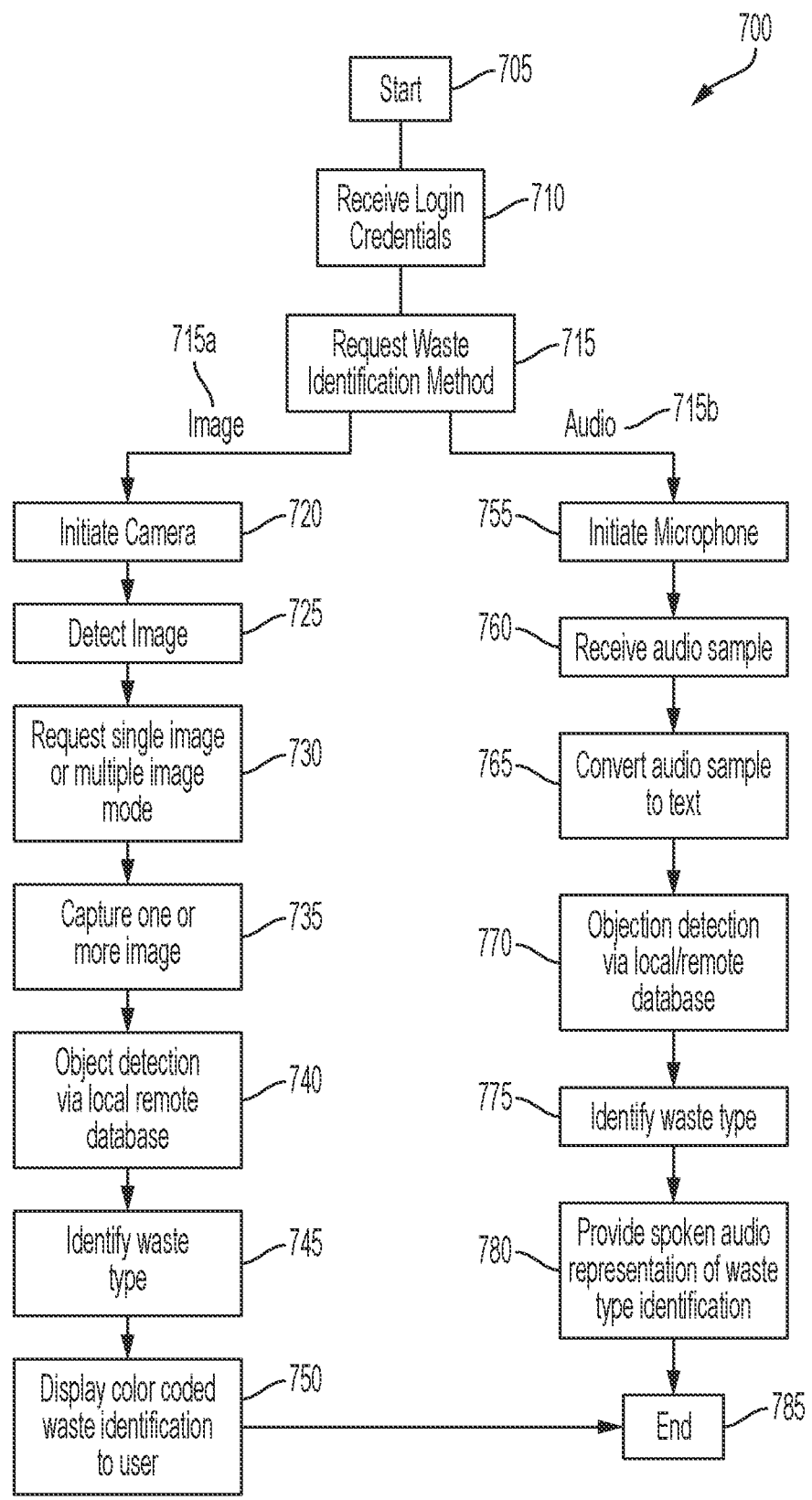
FIG. 7 illustrates a method for identifying, classifying and suggesting a disposal solution for waste items.

FIG. 7 illustrates a method 700 for identifying, classifying and suggesting a disposal solution for waste items. Method 700 may be executed by a processor associated with device 105, shown in FIG. 1. Method 700 may be executed by a processor associated with device 105 in conjunction with a processor associated with one or more of server computer 140 and cloud server 145. Method 700 begins at start step 705 which may be a user initiating the functionality from a home screen on device 105, such as a smartphone, for example. Step 710 continues method 700 by requesting and receiving login credentials. Method 700 then queries the user to request a waste identification method at step 715 which is either through an image at step 715a or via audio input 715b, both of which are discussed above.

When an image is selected at step 715a, device 105 may initiate a camera at step 720. At step 725, device 105 may detect an image at step 725, which may be a waste item, such as a cardboard bottle. Device 105 may request, once the image is detected at step 725, whether the user desires to use a single image or multiple image mode (e.g., how many times the user intends to request identification of waste items). At step 735, device 105 may capture one or more image of a waste item and communicate data representative of the image to server computer 140 and/or cloud server 145. At step 740, server computer 140 and/or cloud server 145 evaluate the object provided in the data representative of the image and. At step 745, the server computer 140 and/or cloud server 145 identifies a waste type suggested for the evaluated object. Server computer 140 and/or cloud server 145 may provide information to device 105 which displays an identification and classification of the waste on the screen of the device, which may be color coded. The identification and classification may provide the user with a suggestion (e.g., compost, class 1 recyclable, class 2 recyclable, etc.) for disposing of the waste item. Once the suggestion has been provided, method 700 may end at step 785.

Turning to step 715b, where audio input is the basis for identification and classification of waste items, method 700 continues from step 715 at step 755 by causing device 105 to initiate one or more microphones 160 at step 755. Step 215B and subsequent steps may be used in conjunction with step 215A and subsequent steps such that an audio identification and a visual identification together. Once the one or more microphones 160 are initiated at step 755, device 105 may receive an audio sample at step 760 which may be representative of a verbal explanation or description of a waste item. Once the audio sample is received at step 760, device 105 may convert the sample to text at step 765 and query server computer 140 and/or cloud computer 145 for an identification. Device 105 may receive an indication of an identification and classification of a waste object detected in the text at step 770 and step 775. The identification and classification of a waste type may include information such as an appropriate disposal method for the waste item (such as, for example, compost, class 1 recyclable, class 2 recyclable, etc.). Device 105 may further provide a spoken audio representation of the waste type identification at step 780 by emitting an audible statement such as "The paper plate should be disposed in the recycling. The lasagna should be composted." Once the spoken audio representation of the waste type identification is emitted at step 780, method 700 ends.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A device, comprising:
a processor;
a display; and
a camera;
wherein the device:
receives, by the processor, photographic input related to one or more waste items via the camera,
transmits, by the processor, and to a computer server, the photographic input related to the one or more waste items;
receives, from the computer server, an identification of the one or more waste items, based on evaluation of the transmitted photographic input using a trained machine learning model to recognize the one or more waste items,
classifies, by the processor, a disposal type for the one or more waste item items, and
provides, by the processor, a suggestion on the display for the disposal type of the one or more waste items,
wherein the suggestion on the display is color coded on the screen to coincide with the classified disposal type for the one or more waste items and encircles the one or more waste items and the suggestion further includes a confidence percentage in the classification of the disposal type for the one or more waste items,
wherein the disposal type for the one or more waste items includes one or more disposal types from the group of trash, recycling, and composting.

2. The device of claim 1, wherein the display provides an option to take a single photographic image of the one or more waste items.

3. The device of claim 1, wherein the display provides an option to take multiple photographic images of multiple waste items in addition to the one or more waste items.

4. The device of claim 1, wherein the suggestion for the disposal type of the waste item is further audibly emitted from the device.

5. A method, comprising:
receiving, by a processor, photographic input, received from a camera, related to one or more waste items;
transmitting, by the processor, and to a computer server, the photographic input related to the one or more waste items;
receiving, from the computer server, an identification of the one or more waste items, based on evaluation of the transmitted photographic input using a trained machine learning model to recognize the one or more waste items;
classifying, by the processor, a disposal type for the one or more waste items; and
displaying, on a screen associated with the processor, a suggestion for the disposal type of the one or more waste items;
wherein the suggestion on the display is color coded on the screen to coincide with the classified disposal type for the one or more waste items and encircles the one or more waste items and the suggestion further includes a confidence percentage in the classification of the disposal type for the one or more waste items,
wherein the disposal type for the one or more waste items includes one or more disposal types from the group of trash, recycling, and composting.

6. The method of claim 5, further comprising:
displaying, on the screen associated with the processor, an option to take a single photographic image of the one or more waste items.

7. The method of claim 5, further comprising:
displaying, on the screen associated with the processor, an option to take a multiple photographic images of multiple waste items in addition to the one or more waste items.

8. The method of claim 5, further comprising audibly emitting, by one or more speakers associated with the processor, the suggestion for the disposal type of the waste item.

9. The method of claim 5, further comprising receiving, by the processor, an upload of the photographic input related to one or more waste items and applying the upload to train the processor by machine learning to identify the type of the one or more waste items.

10. The method of claim 5, wherein identifying the one or more items includes object detection of the one or more waste items via a remote memory storage unit.

11. The method of claim 5, wherein the photographic input is provided by the camera which is also associated with the processor.

* * * * *